(12) United States Patent
Ziegler et al.

(10) Patent No.: US 6,755,294 B2
(45) Date of Patent: Jun. 29, 2004

(54) PRESSURE PLATE ASSEMBLY FOR A FRICTION CLUTCH

(75) Inventors: Erwin Ziegler, Gressthal (DE); Reinhold Weidinger, Unterspiesheim (DE); Frank Hirschmann, Niederwerrn (DE); Klaus Steinel, Bergrheinfeld (DE); Wolfram Hick, Schwanfeld (DE); Norbert Lohaus, Schweinfurt (DE); Joachim Lindner, Dittelbrunn (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/261,271

(22) Filed: Sep. 30, 2002

(65) Prior Publication Data

US 2003/0062237 A1 Apr. 3, 2003

(30) Foreign Application Priority Data

Oct. 1, 2001 (DE) .......................................... 101 48 434

(51) Int. Cl.[7] .............................................. F16D 13/75
(52) U.S. Cl. ................................. 192/70.25; 192/30 W
(58) Field of Search .......................... 192/70.25, 111 A, 192/30 W (56) References Cited

U.S. PATENT DOCUMENTS 5,531,308 A    7/1996  Gochenour et al. ...... 192/70.25
6,491,151 B1 * 12/2002  Weidinger ............... 192/70.25

* cited by examiner

Primary Examiner—Rodney H. Bonck
(74) Attorney, Agent, or Firm—Cohen, Pontani, Lieberman & Pavane (57) ABSTRACT

A pressure plate assembly for a friction clutch, which assembly includes a housing; a pressure plate connected to the housing for rotation in common around an axis of rotation and which is free to move axially with respect to the housing; a stored-energy device, which pretensions the pressure plate in the axial direction with respect to the housing; a wear-compensating device which acts in the path of support between the stored-energy device and at least one of the housing and the pressure plate and comprises at least one wear-compensating element which is free to move when wear occurs and/or when wear is compensated; an indicator arrangement, comprising at least one indicator opening in the housing and at least one indicator element on a wear-compensating element. The indicator element at least partially fills at least one indicator opening in at least one state of wear; information concerning the amount of wear which has occurred can be derived from the position of the indicator element relative to the minimum of one indicator opening.

26 Claims, 10 Drawing Sheets

PRESSURE PLATE ASSEMBLY FOR A FRICTION CLUTCH

BACKGROUND OF THE INVENTION

1. Field of the Invention

The present invention pertains to a pressure plate assembly for a friction clutch, which assembly includes a housing; a pressure plate connected to the housing for rotation in common around an axis of rotation which is free to move axially with respect to the housing; a stored-energy device which pretensions the pressure plate in the axial direction with respect to the housing; a wear-compensating device which acts in the path of support between the stored-energy device and at least one of the housing and the pressure plate and comprises at least one wear-compensating element, which is free to move when wear occurs and/or when wear is compensated; an indicator arrangement comprising at least one indicator opening in the housing and at least one indicator element on a wear-compensating element, where information concerning the amount of wear which has occurred can be derived from the position of the indicator element relative to the minimum of one indicator opening.

2. Description of the Related Art

U.S. Pat. No. 5,531,308 discloses a friction clutch in which a wear-compensating device can be used to ensure that the wear which occurs during the operation of the clutch, such as the wear of the friction linings of a clutch disk, for example, is compensated. For this purpose, two adjusting rings are provided, one of which is held nonrotatably with respect to a housing, whereas the other adjusting ring is free to rotate to compensate for wear. The two rings have corresponding ramp surfaces, so that, upon rotation of the second adjusting ring, the total axial length of the wear-compensating device consisting essentially of the two adjusting rings changes. On the adjusting ring which can rotate relative to the housing, an axial projection is provided, which engages in a curved, slot-like opening in the housing, i.e., in a bottom area of the housing. When the adjusting ring turns, this projection moves in the opening through which it passes. From the position which this projection occupies in the opening, it can be determined how far the rotatable adjusting ring has rotated up to that point, which is an indication in turn of the extent to which wear compensation has occurred and thus also of the amount of wear which has occurred.

SUMMARY OF THE INVENTION

It is the task of the present invention to improve a pressure plate assembly of the general type in question in such a way that, by the use of a simple design, the amount of wear which has occurred can be detected more easily.

According to the invention, the indicator element at least partially fills at least one indicator opening in at least one state of wear.

With the design of a pressure plate assembly according to the invention, the geometry of the indicator element can be made essentially independent of the geometry of the indicator opening. This facilitates the design and also makes it possible for both the indicator element and the indicator opening to be designed with respect to their shape and/or configuration in such a way that, through the cooperation of these two assemblies, a very precise indication of the actual amount of wear which has occurred or of the degree of wear compensation which has occurred can be obtained.

It is possible, for example, for the width of the indicator element, i.e., the dimension essentially transverse to the direction of its movement with respect to the minimum of one indicator opening, to change over the length of the indicator element in the direction of movement. It is thus achieved that the width of the indicator element visible in the minimum of one indicator opening changes as the element moves past, so that, as the indicator element moves, the area of the indicator opening which it fills also changes, from which information can be derived concerning different states of wear.

For this purpose, it is possible, for example, for the width of the indicator element to change continuously, at least in certain of its areas. Alternatively or in addition, it is possible for the width of the indicator element to change in step-like increments. Although a step-like change in width produces a very clear-cut discontinuity in the indicator characteristic, an indicator element with a continuous change in width provides information of higher resolution concerning the state of wear.

It is also possible to provide a plurality of indicator openings in succession in the direction of the movement of the indicator element. In another, preferred embodiment of the pressure plate assembly according to the invention, it is possible, in conjunction with the provision of a plurality of indicator openings, for the indicator element to have an indicator section which fills essentially all of the indicator openings in one wear state and at least partially fills one indicator opening or essentially no indicator opening in at least one other wear state. It can therefore be provided, for example, that the indicator fills all of the indicator openings when the clutch is new and has not yet been affected by wear, and that, as the amount of wear increases, the indicator element moves successively along the indicator openings and thus opens various indicator openings one after the other.

As an alternative, it is also possible for the indicator element to have an indicator section which does not fill all of the indicator openings in any wear state. It can be provided in this case, for example, that, as a function of the amount of wear which has occurred, the indicator section completely fills one of the indicator openings or partially fills two of the indicator openings.

In a design of the pressure plate assembly which is very simple to realize, it is possible for the wear-compensating device to comprise an adjusting ring, which can rotate around the axis of rotation for the purpose of wear compensation, and for the indicator element to be free to move along with the adjusting ring constituting the wear-compensating element.

An alternative embodiment of the pressure plate assembly according to the invention can be designed in such a way that the wear-compensating device comprises: an arresting element which, upon the occurrence of wear, is able to move with respect to the pressure plate assembly in correspondence with the amount of wear which has occurred; an essentially wedge-shaped slider element, which is installed between the pressure plate assembly and the arresting element and which, upon movement of the arresting element with respect to the pressure plate assembly, is free to move under the pretensioning effect in correspondence with the extent of the movement of the arresting element with respect to the pressure plate assembly in order to keep the arresting element in the position relative to the pressure plate assembly to which it has moved as a result of wear; and an adjusting ring, which is able to rotate around the axis of”

rotation to perform a wear-compensating movement, where the adjusting rotation of the adjusting ring is limited by the slider element and/or by the arresting element, where the indicator element is able to move along with the slider element forming the wear-compensating element.

In addition, the pressure plate assembly according to the invention can be designed so that the stored-energy device is located in an area between the indicator element and the minimum of one indicator opening and has a see-through opening associated with the minimum of one indicator opening. To avoid the introduction of additional openings in the stored-energy device, it is possible, for example, for the see-through opening to be formed by an area between two of the spring tongues of the stored-energy device.

It is also possible, according to the invention, for the indicator element to be connected to the wear-compensating element by connecting sections provided on the indicator element. It is also possible for the indicator element to have a contact area, by means of which it is supported on a surface of the wear-compensating element facing the axis of rotation. It is possible in this way to prevent the indicator element from shifting position as a result of centrifugal force during rotational operation.

The present invention also pertains to a friction clutch which contains a pressure plate assembly according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

The essential principles of the design and function of a friction clutch in which the present invention can be realized are described in the following with reference to FIGS. 1–4.

Figure 1:
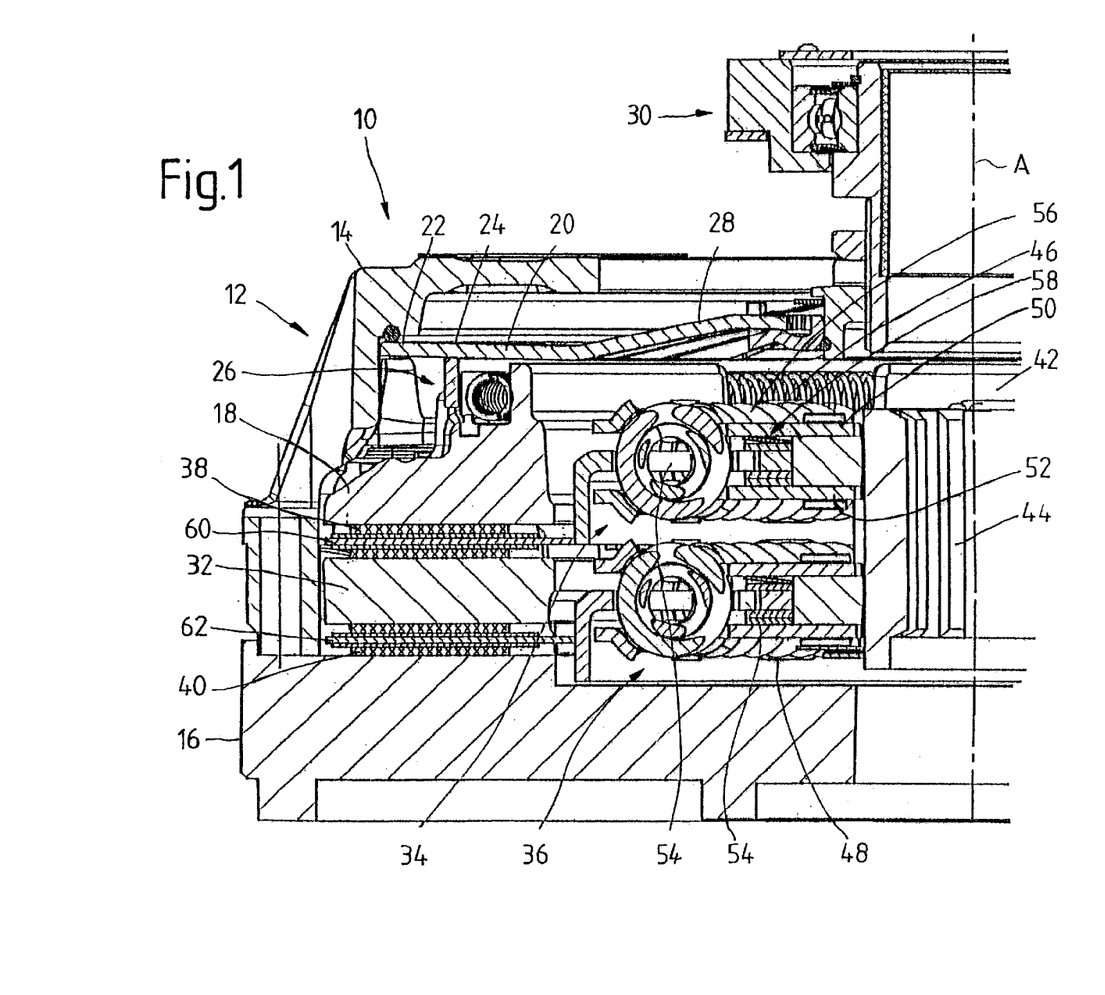
FIG. 1 is a partial longitudinal section view of a motor vehicle friction clutch designed as a double clutch in which the principles of the present invention can be realized.

The friction clutch 10 comprises a pressure plate assembly 12 with a housing 14, the radially outer area of which is or can be connected to a flywheel 16. The flywheel 16 can be designed as single mass, but it can also obviously be designed as a multi-mass flywheel. In the radially inner area, the flywheel 16 is designed so that it can be connected norotatably to a drive shaft, such as to the crankshaft of an internal combustion engine.

The pressure plate assembly 12 also includes a pressure plate 18, which is connected in an essentially nonrotatable manner by, for example, a plurality of tangential leaf springs or the like, to the housing 14, but is able to shift position with respect to the housing 14 within a limited axial range in the direction of an axis of rotation A. The radially outer area 22 of a stored-energy device 20, which can be designed, for example, as a diaphragm spring, is supported on the housing 14, whereas the area 24 farther inward in the radial direction acts on the pressure plate 18 by way of a wear-compensating device 26, to be described in greater detail further below. A release mechanism 30 for executing disengaging processes of the pull type acts on the spring tongues 28 located radially on the inside.

The pressure plate assembly 12 also includes an intermediate plate 32, which is also connected to the housing 14 with freedom to move within a certain axial range but without any freedom to rotate relative to the housing.

The pressure plate assembly 12, i.e., the friction clutch 10, comprises in addition two clutch disks, designated 34 and 36 overall. Each of these clutch disks has a friction lining 38, 40 in the radially outer area, and in the radially inner area they have a hub 42, the wedge-like teeth 44 or the like of which can be positioned nonrotatably on a power takeoff shaft, such as the input shaft to a transmission.

Each of the two clutch disks 34, 36 also has a torsional vibration damping arrangement 46, 48. The two torsional vibration damping arrangements 46, 48 are both designed in the same way in the example presented here and comprise, as will be described below on the basis of the clutch disk 34 in the following, two cover disk elements 50, 52, which are connected in the radially inner area to the hub 42 for rotation in common, either directly or via an additional predamper stage. Here, for example, the two cover disk elements 50, 52 can have sets of internal teeth which mesh with corresponding external teeth on the hub 42. Axially between the two cover disk elements 50, 52 is a central disk element 54. Both the cover disk elements 50, 52 and the central disk element 54 have spring windows with control edges in the circumferential direction, on each of which the end of damper spring 56 is supported in the circumferential direction. Several damper springs 56 in a row in the circumferential direction or groups of damper springs 56, nested radially inside each other, for example can be provided as generally known in and of itself for torsional vibration damper arrangements normally provided for clutch disks. Because of the presence of the damper springs 56, a limited circumferential mobility of the central disk element 54 with respect to the associated cover disk elements 50, 52 is made possible. Here, in a manner known in and of itself, a stop for limiting rotational movement can be provided to prevent the damper springs 56 from being "set on block". In addition, a dry friction device, designated 58 overall in the figures, can be provided to contribute by Coulomb friction to the vibration damping above and beyond the damping effect provided by compression of the springs. As already explained, it is obviously possible to design the torsional vibration damping arrangements 46, 48 with several stages, such as through the provision of an additional set of cover disk elements axially farther toward the outside and an associated set of springs, which can then act between the cover disk elements 50, 52 and these additional cover disk elements.

The central disk elements 54 of the two clutch disks 34, 36 carry in their radially outer area disk like friction lining carriers 60, 62, which again carry the friction linings 38, 40 via associated leaf springs or the like or can themselves be the spring linings.

In the engaged state, the stored-energy device 20 presses down via the previously mentioned wear-compensating device 26 on the pressure plate 18. This presses the friction linings 38 of the clutch disk 34 against the intermediate plate 32. The clutch disk 36 with its friction linings 40 can then be clamped between the intermediate plate 32 and the flywheel 16. As a result of this friction-locking connection, therefore, a nonrotatable connection is established between the pressure plate 18, the intermediate plate 32, and the flywheel 16 on the one side and the two clutch disks 34, 36 or the common hub 42 of the disks on the other. For the transition to the disengaged state, a pulling force is exerted on the spring tongues 28 of the stored-energy device 20. This moves area 24 of the device axially away from the flywheel 16, and the device thus releases at least some the force it is exerting on the pressure plate 18. Under the action of the previously mentioned tangential leaf springs or the like, the pressure plate 18 and the intermediate plate 32 are then also moved away axially away from the flywheel 16, so that, by the release of the clamping action, the two clutch disks 34, 36 are also released.

In the following, the design and function of the wear-compensating device 26 is described with reference to FIGS. 2–4.

The wear-compensating device 26 comprises an adjusting 64 ring, one axial side of which is acted on by the stored-energy device 20. The other axial side of the adjusting ring 64 has several ramp or wedge surfaces arranged in a row in the circumferential direction; the height of these ramps changes in the circumferential direction. Axially opposite these surfaces are corresponding surfaces of the pressure plate 18. A rotation of the adjusting ring 64 has the result that the surface of the ring acted on by the stored-energy device 20 changes its axial level with respect to the pressure plate 18. As a result of the pretensioning spring 66, which can be designed as a helical tension spring, for example, the adjusting ring 64 is preloaded for rotational movement around the axis of rotation A with respect to the pressure plate 18 in the direction such that, upon release of the adjusting ring 64, the ring is pushed in the axial direction so that the surface of the ring actuated by the stored-energy device 20 moves away from the pressure plate 18. For this purpose, the pretensioning spring 66 is held in place at one end on the pressure plate 18 and at the other end on the adjusting ring 64.

The wear-compensating device 26 also includes a wedge-like, curved slider 68, the curvature of which conforms to the curved contour of the adjusting ring 64; a longitudinal section 70 of the slider rests against an inner circumferential area of an axial shoulder on the pressure plate 18. The slider 68 is designed basically for sliding in the circumferential direction. One end of a leaf-like arresting element 76 is fixed in place at one end on the pressure plate 18; the other circumferential end 77 of the arresting element extends over the wedge-like elongated area 70 of the wedge-like slider 68. As a result of the leaf spring-like design, the arresting element 76 presses on the slider 68 and thus pushes it against the pressure plate 18. One end of another pretensioning spring 80 is hooked onto a hook section 78 of the slider 68, whereas the other end is hooked onto the end of spring 66 by which spring 66 is hooked onto the adjusting ring 64. As a result of the pretensioning spring 80, the slider 68 is induced to slide in one circumferential direction, this being the direction in which the increasingly larger axial dimension of the slider tries to fill up the area between the pressure plate 18 and the end area 77 of the arresting element 76. The arresting element 76, however, the end area 77 of which is pretensioned against the pressure plate 18, basically prevents the slider 68 from executing this type of sliding movement in the circumferential direction.

Figures 2, 3, 4:
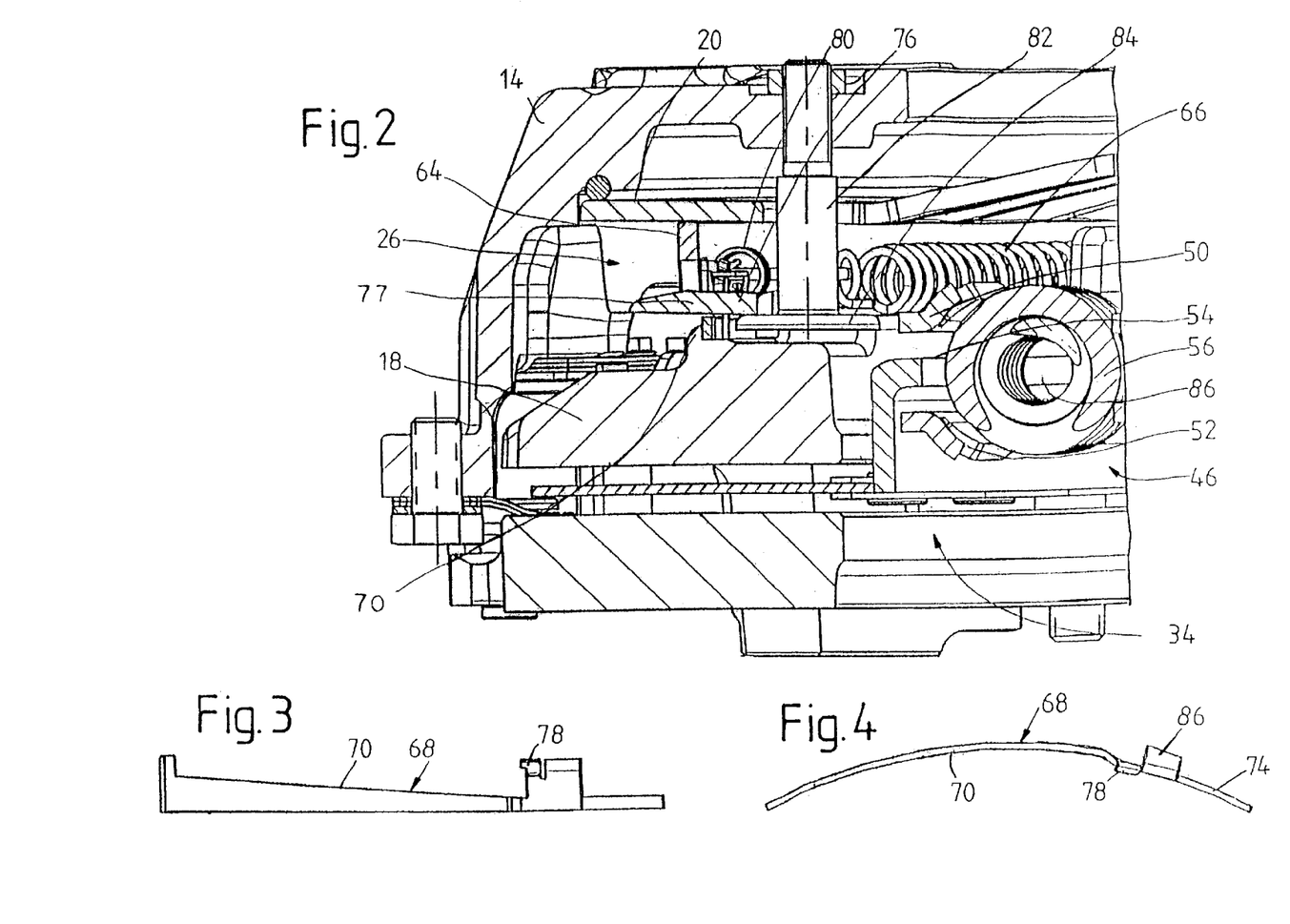
FIG. 2 is a detailed longitudinal section view of a pressure plate assembly of the friction clutch shown in FIG. 1.
FIG. 3 is a side view of a slider element used in the pressure plate assembly shown in FIG. 2.
FIG. 4 is a plan view of the slider element.

It can be seen especially clearly in FIG. 4 that the slider 70 has a blocking section 86, which is bent outward in the radial direction. This blocking section 86 extends radially outward to engage in an associated circumferential opening in the adjusting ring 64; this circumferential opening, which cannot be seen in the figures, has a larger circumferential dimension than the blocking section 86. This therefore means that the blocking section 86 has a certain limited freedom to move circumferentially in this circumferential opening of the adjusting ring 64.

There is a stop element 82 on the housing 14, also radially inside the adjusting ring 64 and near the end area 77 of the arresting element 76. This stop can be designed as a threaded bolt, which is screwed into a corresponding threaded hole in the housing 14, and which has a mushroom-like head. The head 84 grips under the arresting element 76, that is, it projects into the space formed between the arresting element 76 and the pressure plate 18.

In the following, the way in which the wear-compensating device 26 functions upon the occurrence of wear, that is, upon abrasion of the friction linings 38, 40, is described.

The friction linings 38, 40 are subjected to heavy stress, especially during the execution of clutch-engaging operations, so that abrasion occurs primarily under these conditions. Abrasion of the friction linings 38, 40 of the two clutch disks 34, 36, however, has the result that the intermediate plate 32 and the pressure plate 18 are moved closer to the flywheel 16. The stored-energy device 20 basically follows along after this movement by changing its installation position correspondingly when in the engaged state. Once the wear reaches a certain point, the end area 77 of the arresting element 76 arrives in contact with the stop element 82, i.e., with the mushroom-shaped head 84 of this element. As the amount of wear becomes even greater, the previously described displacement of the pressure plate 18 toward the flywheel 16 has the result that the end area 77 of the arresting element 76 remains hanging on the stop element 82, which means that this end area 77 can no longer follow along after the displacement of the pressure plate 18. The intermediate space formed between the arresting element 76 and the pressure plate 18, which space is filled up by the wedge-like section 70 of the slider 68, thus becomes larger. This enlargement allows the slider 68 to move slightly in the circumferential direction. The displacement of the slider 68 in the circumferential direction thus ultimately corresponds to the amount of wear. This displacement of the slider 68 in the circumferential direction is possible in particular because the blocking section 86 has a certain circumferential play in the previously mentioned opening in the adjusting ring 64. Upon the occurrence of wear, therefore, first only a certain part of the arresting element 76 will be able to move axially with respect to the pressure plate 18, and in correspondence with that, the slider 68 will also move to a certain extent in the circumferential direction. The pretensioning spring 80 thus relaxes slightly. Because, in the engaged state, the adjusting ring 64 is acted on by the diaphragm spring, i.e., by the stored-energy device 20, this ring will not at first be able to rotate circumferentially with respect to the pressure plate 18. Only upon the performance of a release operation, that is, after the diaphragm spring 20 releases its comparatively strong force as a result of the above-mentioned pulling action and the contact force of the adjusting ring 64 on the stored-energy device 20 is defined essentially only by the previously mentioned tangential leaf springs, which also provide the release force, can the adjusting ring 64, under the preloading effect of the pretensioning spring 66, move slightly in the circumferential direction until one of the circumferential ends of the opening in it makes contact with the blocking section 86. Because the circumferential movement of the slider 68 already corresponds with the wear which has occurred, the rotational movement of the adjusting ring 64, which becomes possible upon execution of a release operation, also corresponds to the wear which has occurred. Upon this rotational movement, the pretensioning spring 66 relaxes slightly, but simultaneously the pretensioning spring 80 is tensioned again somewhat more strongly. The result of this is that the pretensioning force applied by the spring 66 must be greater than the pretensioning force applied by the spring 80.

As a result of the rotation of the adjusting ring 64, which, upon occurrence of wear, becomes possible in the disengaged state, this ring will, as already mentioned, become displaced axially with respect to the pressure plate 18. The entire assembly clamped axially between the stored-energy device 20 and the flywheel 16, comprising the adjusting ring 64, the pressure plate 18, the clutch disk 34 in the area of its friction linings 38, the intermediate plate 32, and the clutch disk 36 in the area of its friction linings 40, thus retains an approximately constant axial dimension regardless of the amount of wear which has occurred. As a result, the stored-energy device 20 also retains approximately the same installed position. It should be pointed out here that, depending on the degree of inclination of the elongated, wedge-like area 70 of the slider 68, for example, the degree of compensation can be increased or decreased. It should also be pointed out that several of these sliders 68 and their associated arresting elements 76 or stop elements 82 can obviously be distributed around the circumference, although, to implement the previously described wear compensation, a single such slider is sufficient.

Figure 5:
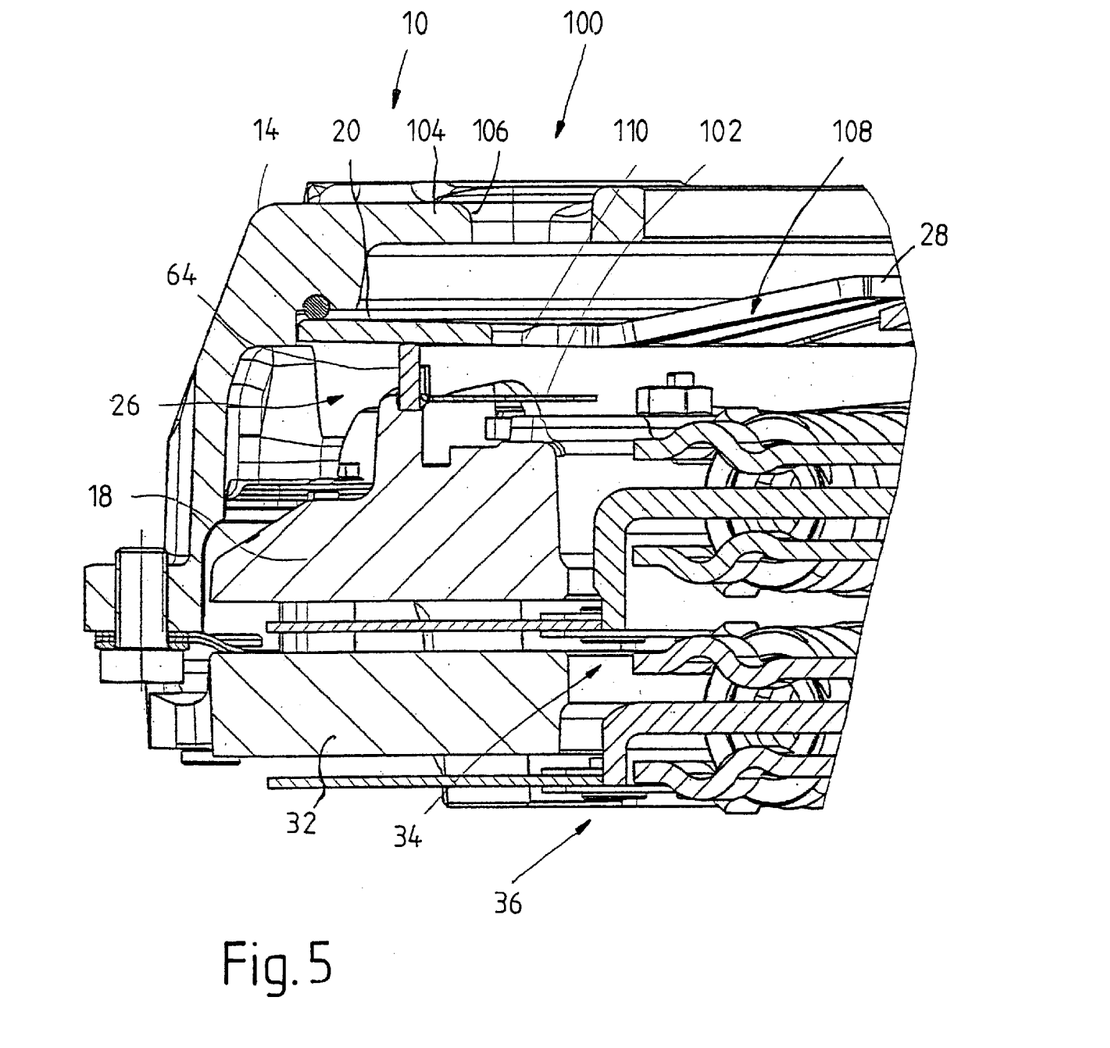
FIG. 5 is a partial longitudinal section view of a first embodiment pressure plate assembly in which the present invention is realized.

Especially in the case of heavily loaded trucks, the friction clutches serving to transmit torque to the driving wheels are subjected to comparatively heavy loads. This usually has the result that, during the operating life of a truck of this type or of its friction clutch, the clutch disks must be replaced at least once, because the friction linings become completely worn out. To ensure that the operator of a vehicle can recognize early enough that the friction clutch has become worn to such an extent that the clutch disks or the clutch disk will have to be replaced at least in the foreseeable future, an indicator arrangement 100, which can be seen in FIG. 5, is provided in the friction clutch according to the invention. This indicator arrangement 100, which is also shown in detail in FIGS. 6 and 7, comprises, first, an indicator element 102, which is attached to the adjusting ring 64, and which therefore moves along with this ring around the axis of rotation A during the performance of a wear-compensating operation. An indicator opening 106 is provided in the housing 14, that is, in a bottom area 104 of the housing, for the indicator element 102. By working together, the indicator element 102 and the indicator opening 106 provided in the housing 14 make it possible to tell how far the adjusting ring 64 has turned up to this point relative to the housing 14 from its original, basic installation position when the clutch was new and thus to tell how much wear compensation has occurred. This makes it possible in turn to infer how much wear the clutch has already suffered and how long it will be before the friction linings or the clutch disks 34, 36 will have to be replaced. Because, as can be seen especially in FIG. 5, the indicator element 102 provided on the adjusting ring 64 is covered by the stored-energy device 20 on the side of the bottom area 104 of the housing 14, the opening 106 is basically positioned radially and circumferentially in an area where there is also a gap 108 present between two spring tongues 28 of the stored-energy device 20, which is designed as a diaphragm spring, or where such a gap terminates in a section 110 of larger dimensions. The indicator element 102 is visible through the indicator opening 106 and the section 110, as illustrated in FIG. 6.

Figure 6:
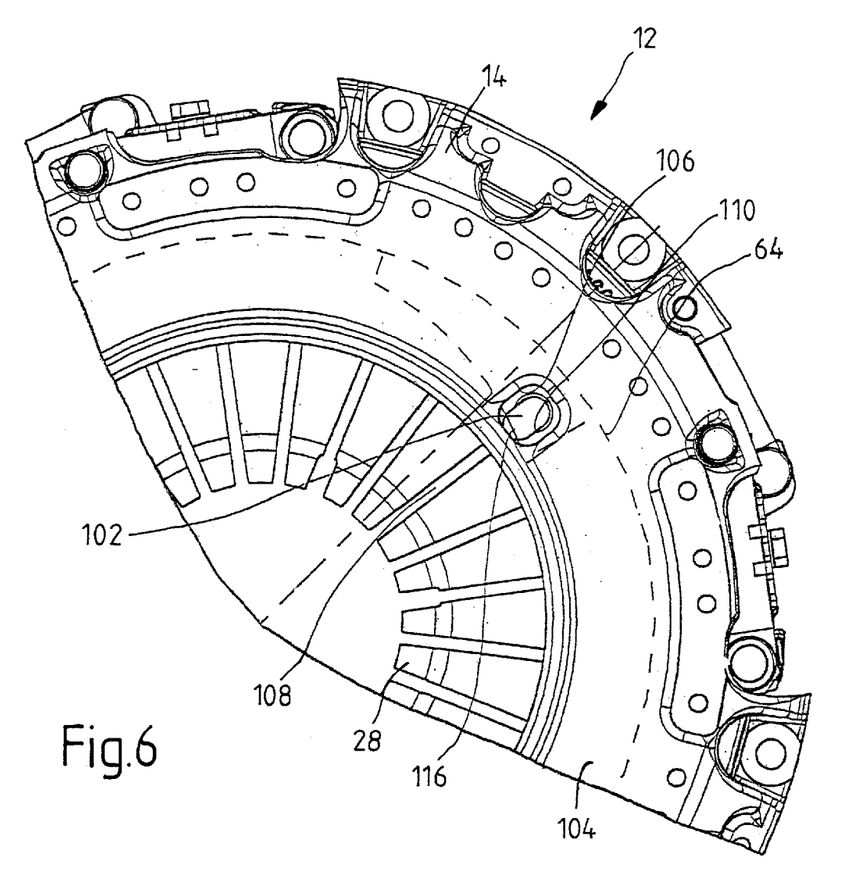
FIG. 6 is a partial axial view of the pressure plate assembly shown in FIG. 5.
Figure 7:
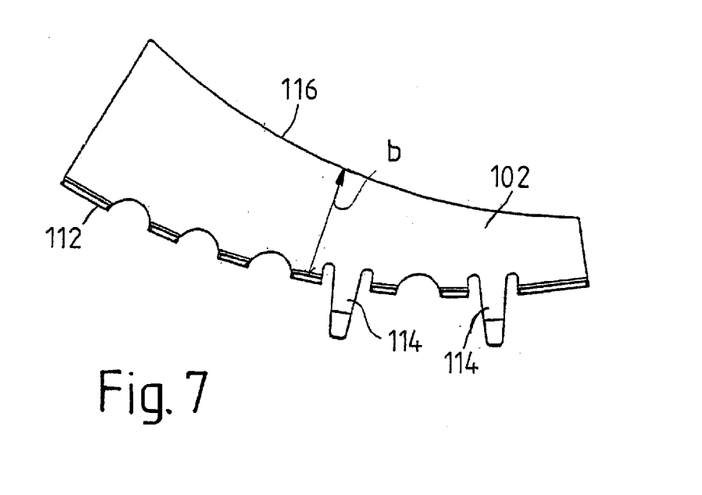
FIG. 7 is a plan view of an indicator element provided on the pressure plate assembly of FIG. 5.

In the case of the embodiment shown in FIGS. 6 and 7, the indicator element 102 is designed so that its width "b" changes continuously in the direction transverse to its circumferential direction. It can be seen that the outside circumferential area of the indicator element 102 to be positioned in contact with the adjusting ring 64 has several contact areas 112, obtained by bending over tab-like projections in the axial direction, by means of which support is provided on the radial inside surface of the adjusting ring 64. In addition, several fastening projections 114 are preferably provided, which extend radially outward through associated openings in the adjusting ring 64 and are bent over on the outside. Thus the indicator element 102 is supported on the adjusting ring 64 both radially on the outside and radially on the inside; the areas 112 and the bent-over end areas of the sections 114 also secure the indicator against tipping on the adjusting ring 64. The radially inward-facing edge 116 of the indicator element 102 is also visible through the indicator opening 106 and through the section 110 in the stored-energy device 20. In the diagram according to FIG. 6, the adjusting ring 64 moves in the clockwise direction together with the indicator element 102 when wear occurs, so that an increasingly smaller part of the indicator opening 106 is filled by the indicator element 102. For example, it is possible, when the clutch is new, for essentially the entire indicator opening 106 to be filled by the indicator element 102, so that at first the edge 116 is not visible. As the wear increases, the adjusting ring 64 rotates and takes the indicator element 102 along with it. A decrease in the degree to which the indicator opening 106 is filled by the indicator element 102 shows that wear compensation has occurred. It is also possible for the indicator element 102 to carry additional markings, for example, which indicate how long the clutch can continue to be used. It would also be possible to use color markings, for example, in which case a red mark, for example, could indicate that the maximum allowable amount of wear is about to be reached.

Figure 8:
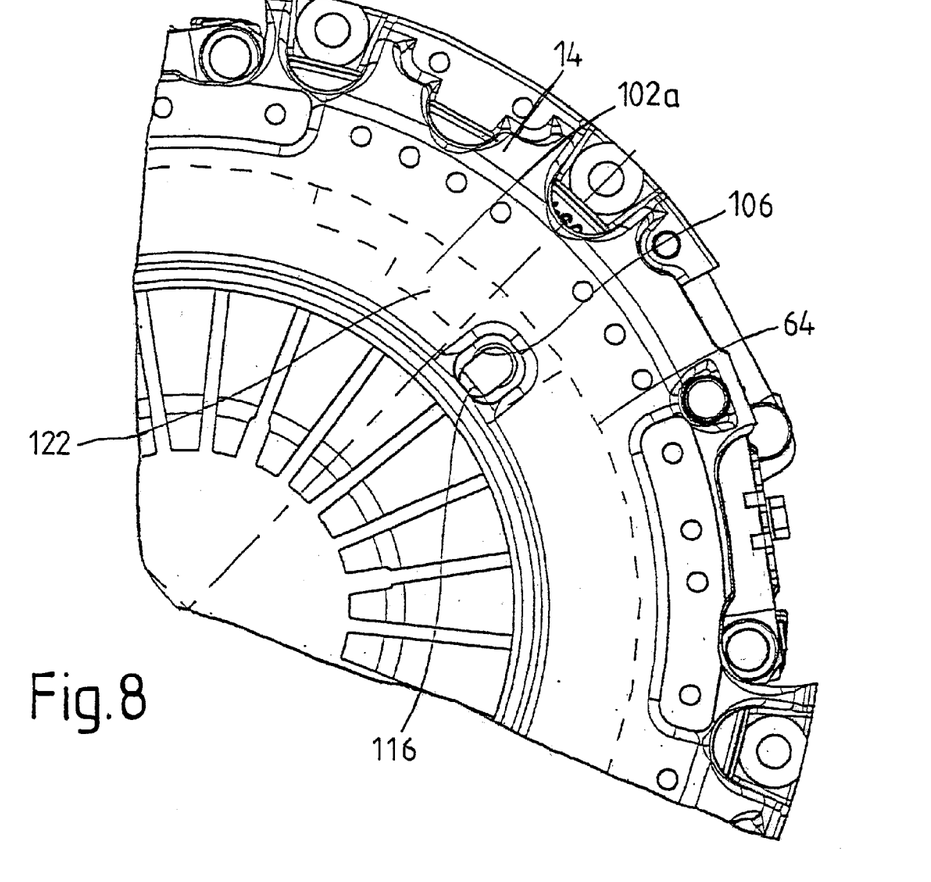
FIG. 8 is a partial axial view of a second embodiment.
Figure 9:
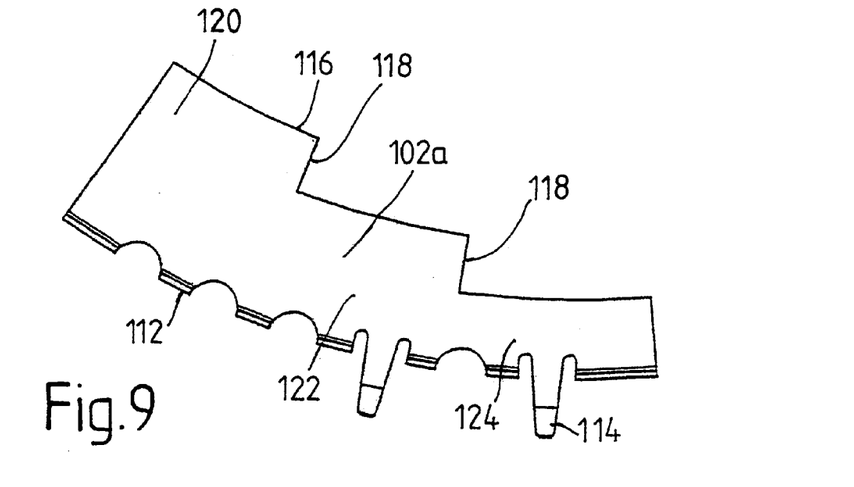
FIG. 9 is a view of the indicator element used in the second embodiment.

A modified embodiment is illustrated in FIGS. 8 and 9. It can be seen here that the indicator element 102a is designed with two step-like changes in width 118 along its edge area 116. It is possible here, for example, for the section 120 with the greatest width to fill up the indicator opening 106 completely when the clutch is new and for the sections 122, 124 to become visible in the area of the indicator opening 106 as the amount of wear increases. Providing these step-like changes makes it very clear to the operator of the vehicle when certain levels of wear have been reached and when the clutch disks should probably be replaced.

Figure 10:
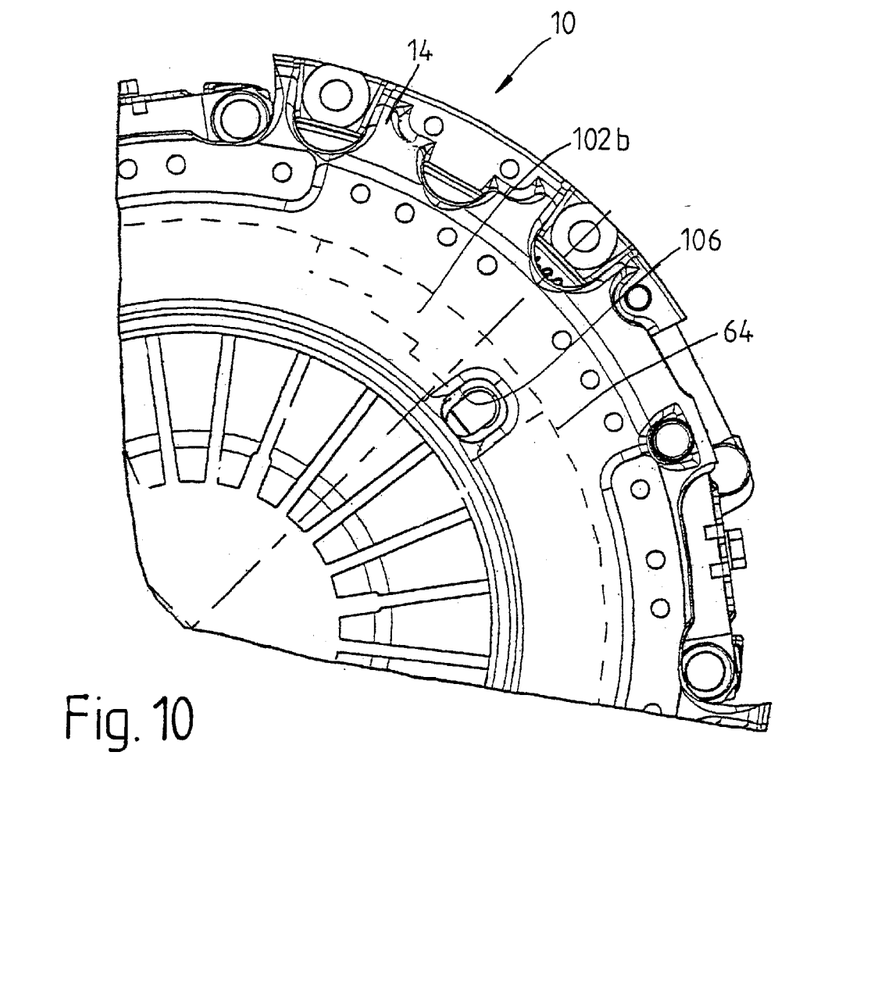
FIG. 10 is a partial axial view of a third embodiment.
Figure 11:
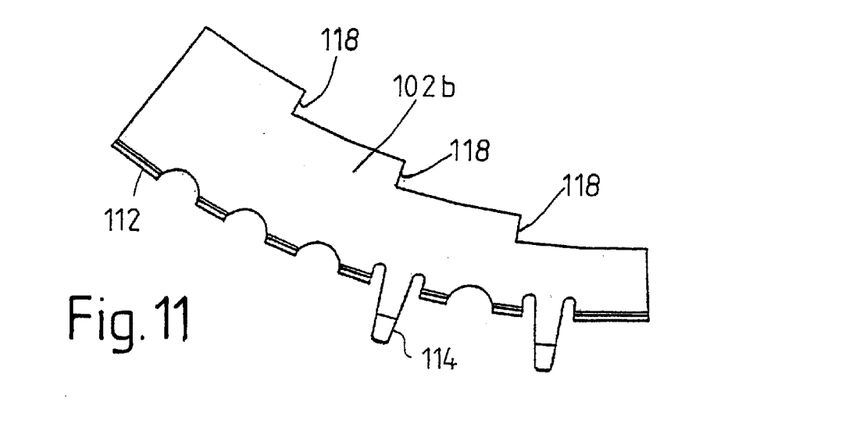
FIG. 11 is a plan view of the indicator element used in the third embodiment.

FIGS. 10 and 11 show another modified embodiment, in which the indicator element 102b now has three step-like width changes 118. Thus several graduated sections of different width are obtained, with the result that a more finely resolved judgment can be made concerning the amount of wear which has occurred up to the point in question.

Figure 12:
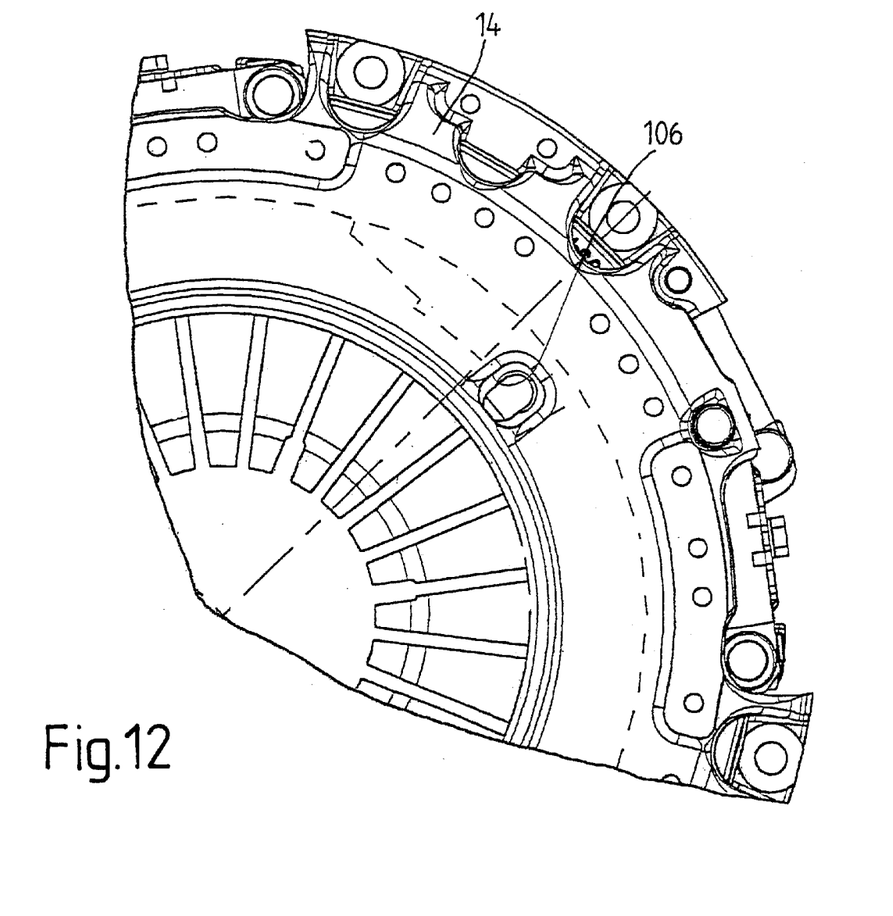
FIG. 12 is a partial axial view of a fourth embodiment.
Figure 13:
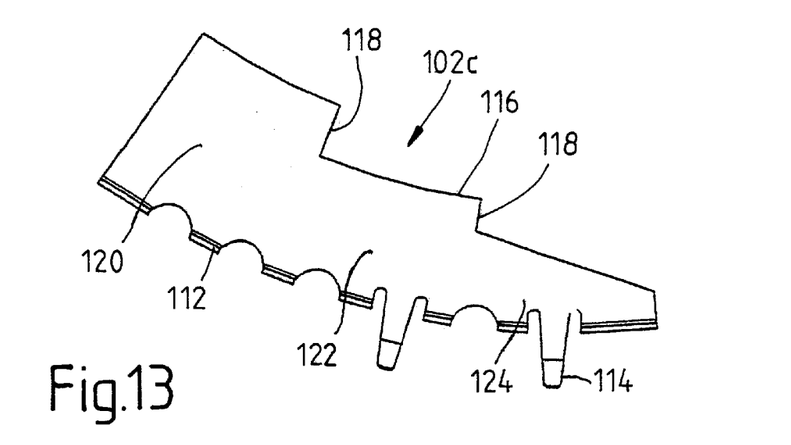
FIG. 13 is a plan view of the indicator element used in the fourth embodiment.

FIGS. 12 and 13 show a modification in which the indicator element 102c has both step-like changes in width 118 and also a section 124, next to the second step-like width change 118, in which a continuous decrease in width is present. As long as the first two width sections 120, 122 are visible in the indicator opening 106 in the housing 14, therefore, it can be concluded that it is not absolutely necessary to take any measure. When the third section 124 becomes visible, one can conclude that the friction linings or clutch disks 34, 36 must be replaced very soon. As a result of the continuous change in width in the section 124, a more accurately resolved judgment can again be made here concerning the state of the wear.

Figure 14:
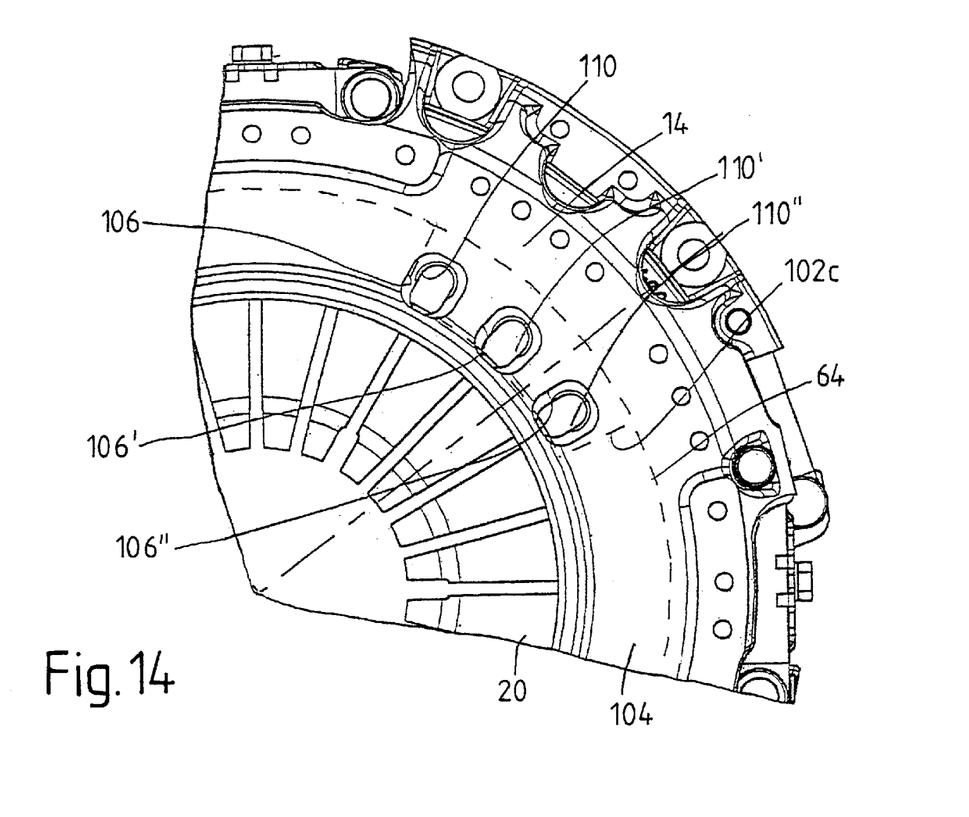
FIG. 14 is a partial axial view of a fifth embodiment.
Figure 15:
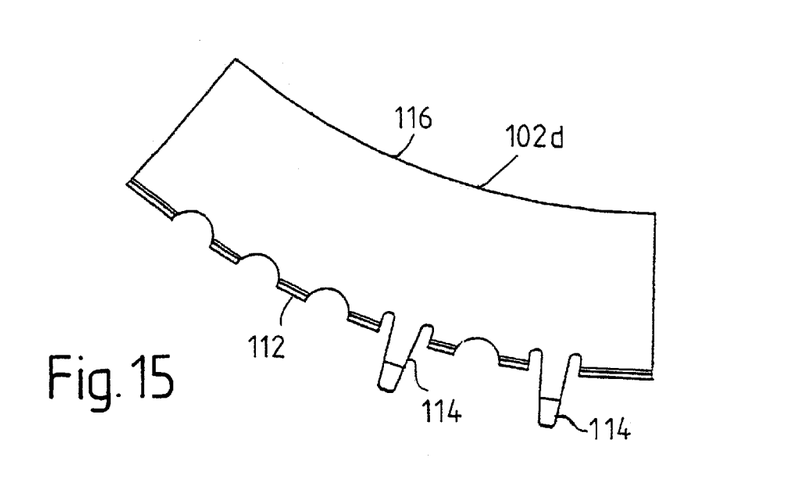
FIG. 15 is a plan view of the indicator element used in the fifth embodiment.

In the design variant shown in FIGS. 14 and 15, three indicator openings 106, 106' 106" are provided in the bottom area 104 of the housing 14, following each other in the circumferential direction, each aligned in the radial and circumferential directions with sections 110, 110', 110" in the stored-energy device 20. The width of the indicator element 102d is approximately constant over its length. The width is preferably calculated so that essentially all of the indicator openings 106, 106', 106" are filled in the radial direction. In the new state of the clutch, the relative positioning is provided which can be seen in FIG. 14; that is, all the indicator openings 106, 106', 106" are filled by the indicator element 102d. Upon the occurrence or wear, the indicator element 102d moves along with the adjusting ring 64 in the circumferential direction, thus moving increasingly out of the area or areas of the indicator openings 106, 106', 106". If, for example, none of these indicator openings is filled any longer by the indicator element 102d, it is obvious that the clutch disks must now be replaced.

Figure 16:
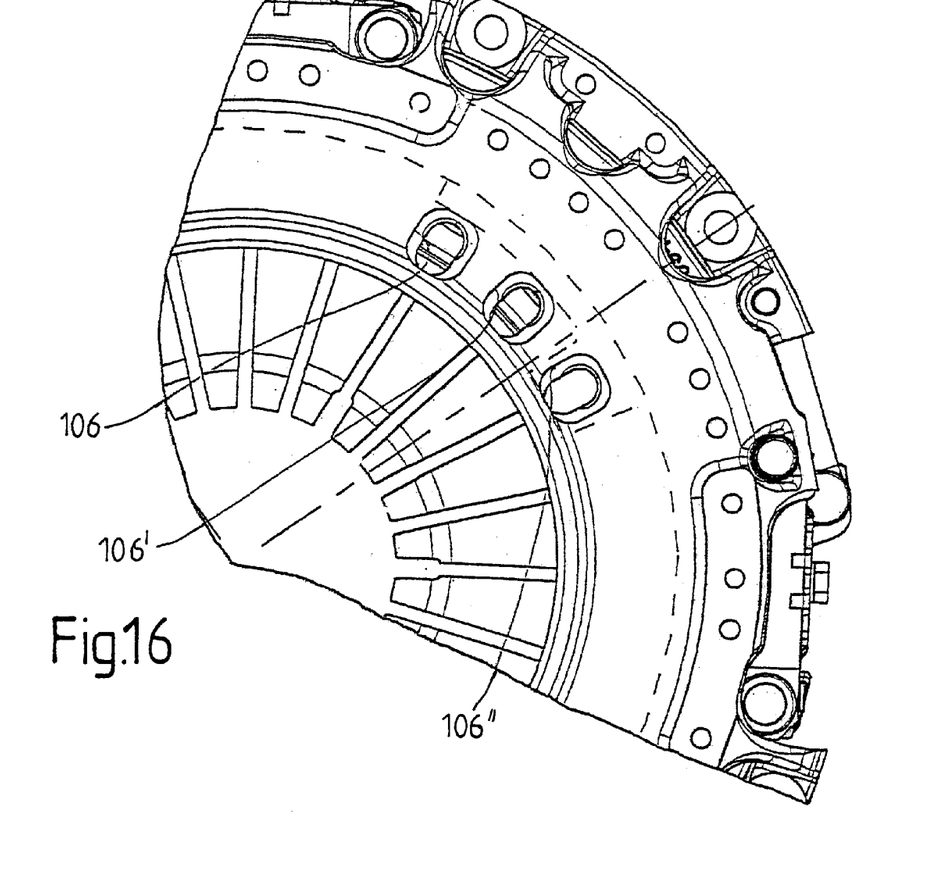
FIG. 16 is a partial axial view of a sixth embodiment.
Figure 17:
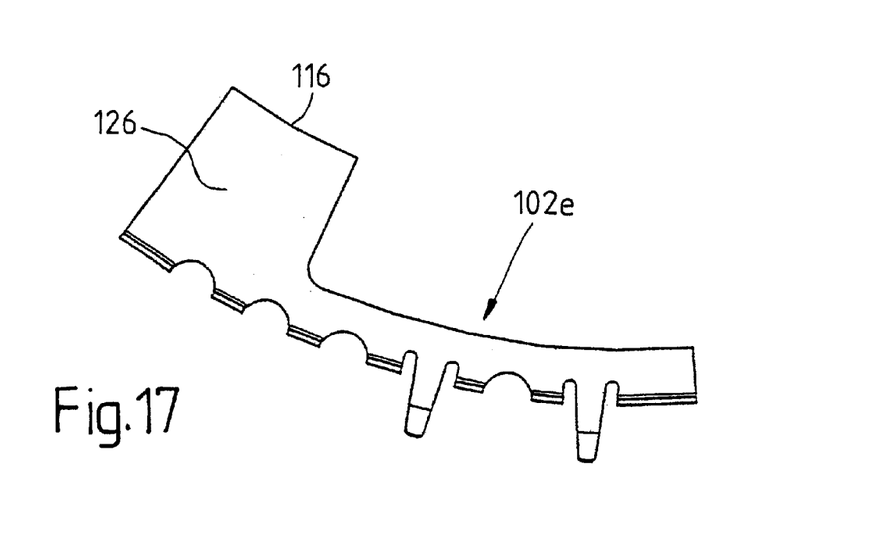
FIG. 17 is a plan view of the indicator element used in the sixth embodiment.

In the case of the design variant shown in FIGS. 16 and 17, which also has the three indicator openings 106, 106', 106", the indicator element 102e has a section 126, which is sized so that it completely fills essentially all of one of the indicator openings 106, 106', 106" in the width, that is, in the radial, direction. In the circumferential direction, that is, in the direction in which the indicator element 102e moves, the section 126, however, is dimensioned so that, in the new state of the clutch shown in FIG. 16, for example, it fills only one of the indicator openings, such as indicator opening 106". Upon the occurrence of wear, section 126 of the indicator element 102 moves out of the area of this opening 106" and arrives in the area of the opening 106'. It is possible, for example, for the section 126 to be visible in the area of only one of the indicator openings 106, 106', 106". It is also possible, as an alternative, for its circumferential dimension to be calculated in such a way that, upon the occurrence of wear, it has not completely disappeared from the area of one indicator opening before it becomes visible in the area of the next indicator opening. Special markings can also be assigned to the indicator openings 106, 106', 106" again, so that, for example, when the indicator opening 106 is completely filled by the section 126, it is evident that the clutch disks are essentially worn out and must be replaced. As in all of the other embodiments according to the invention, however, markings can also be used to indicate intermediate states of wear.

Figure 18:
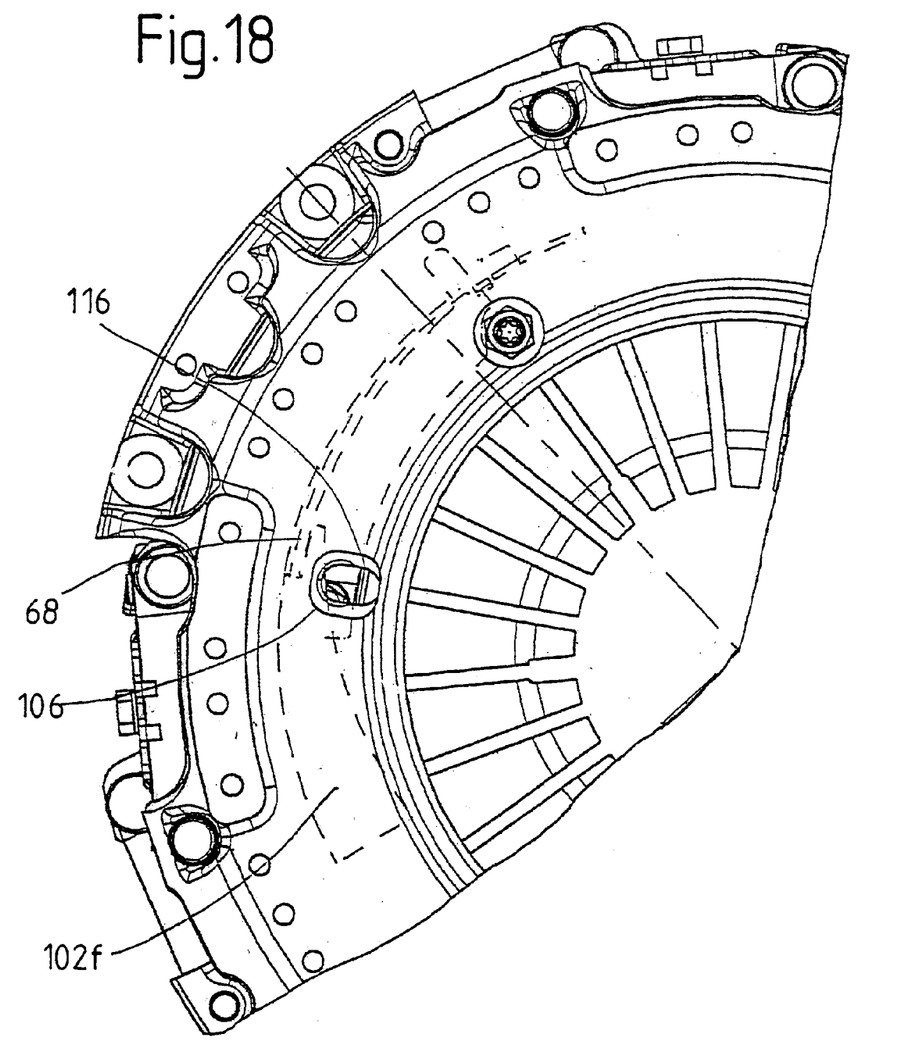
FIG. 18 is a partial axial view of a seventh embodiment of pressure plate assembly according to the invention.

In the case of the design variant shown in FIG. 18, which corresponds essentially to the variant shown in FIGS. 6 and 7 with respect to the indicator arrangement 100, the indicator element 102f is not connected to the adjusting ring 64 for rotation in common but rather to the slider 68, indicated only schematically in FIG. 18. This, too, moves in the circumferential direction when wear occurs, so that, as a result of the connection of the indicator element 102f to this slider 68, it is possible in a similar way for the indicator element 102f to assume a position relative to the associated indicator opening 106 which represents the amount of wear which has occurred. It is obvious that all of the embodiments of the indicator arrangement described above can also be realized when the indicator element is connected to the circumferentially moving slider 68, as shown in FIG. 18.

The present invention thus proposes measures which are easy to implement in terms of design and which make it possible to derive very precise information concerning the amount of wear which has actually occurred in a friction clutch. The various designs based on variations in the width of an indicator element offer very clear criteria to the user, criteria which indicate in unmistakable fashion whether and/or how long a friction clutch or its clutch disk or disks can still be used.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A pressure plate assembly for a friction clutch which is subject to wear, said pressure plate assembly comprising
a housing;
a pressure plate connected to said housing for rotation in common about an axis of rotation, said pressure plate being axially moveable with respect to said housing;
a stored energy device which pretensions said pressure plate in the axial direction with respect to said housing;
a wear-compensating device which acts in the path of support between the stored energy device and at least one of the housing and the pressure plate, said wear compensating device comprising at least one wear compensating element which is free to move when wear occurs; and an indicator arrangement comprising at least one opening in the housing and at least one indicator element on at least one of said wear compensating elements, said indicator element being visible through said opening, the position of the indicator element relative to the at least one opening providing information about the amount of wear of said friction clutch, said indicator element having a length in the direction of movement of said wear compensating device and a width transverse to said direction of movement, said width changing over the length of the indicator element.

2. A pressure plate assembly as in claim 1 wherein said width changes continuously over at least part of said length.

3. A pressure plate assembly as in claim 1 wherein said width has at least one radially stepped change over said length.

4. A pressure plate assembly as in claim 1 comprising a plurality of said indicator openings provided in succession in the direction of movement of said wear compensating element.

5. A pressure plate assembly as in claim 4 wherein said indicator element has an indicator section which in one state of wear fills essentially all of said indicator openings and in another state of wear fills at most only part of an indicator opening.

6. A pressure plate assembly as in claim 4 wherein said indicator element has an indicator section which does not fill all of the indicator openings in any state of wear.

7. A pressure plate assembly as in claim 6 wherein said indicator section completely fills one of said indicator openings in one state of wear and partially fills two of the indicator openings in another state of wear.

8. A pressure plate assembly as in claim 1 wherein said wear compensating element comprises an adjusting ring which can rotate around the axis of rotation to compensate for wear, said indicator element moving with said adjusting ring.

9. A pressure plate assembly as in claim 1 wherein said stored energy device is installed between said indicator element and said at least one indicator opening, said stored energy element having at least one see-through opening which is aligned with a respective at least one indicator opening.

10. A pressure plate assembly as in claim 9 wherein the energy storage device comprises a plurality of spring tongues defining open areas therebetween, said see-through openings being formed by respective said open areas.

11. A pressure plate assembly as in claim 1 wherein the indicator element comprises connecting sections which connect the indicator element to the wear compensating element.

12. A pressure plate assembly as in claim 1 wherein said indicator element comprises a contact area, and said wear compensating element has a surface facing said axis of rotation, said contact area supporting said indicator element on said surface.

13. A motor vehicle friction clutch comprising a pressure plate assembly, said pressure plate assembly comprising:
 a housing;
 a pressure plate connected to said housing for rotation in common about an axis of rotation, said pressure plate being axially moveable with respect to said housing;
 a stored energy device which pretensions said pressure plate in the axial direction with respect to said housing;
 a wear-compensating device which acts in the path of support between the stored energy device and at least one of the housing and the pressure plate, said wear compensating device being comprising at least one wear compensating element which is free to move when wear occurs; and
 an indicator arrangement comprising at least one opening in the housing and at least one indicator element on at least one of said wear compensating elements, said indicator element being visible through said opening, the position of the indicator element relative to the at least one opening providing information about the amount of wear of said friction clutch said indicator element having a length in the direction of movement of said wear compensating device and a width transverse to said direction of movement, said width changing over the length of the indicator element.

14. A pressure plate assembly for a friction clutch which is subject to wear, said pressure plate assembly comprising
 a housing;
 a pressure plate connected to said housing for rotation in common about an axis of rotation, said pressure plate being axially moveable with respect to said housing;
 a stored energy device which pretensions said pressure plate in the axial direction with respect to said housing;
 a wear-compensating device which acts in the path of support between the stored energy device and at least one of the housing and the pressure plate, said wear compensating device comprising an arresting element which, upon the occurrence of wear, is able to move with respect to the pressure plate in correspondence with the amount of wear which has occurred, and an essentially wedge-shaped slider element between the pressure plate and the arresting element, said slider element being pretensioned to move in correspondence with the movement of said arresting element relative to said pressure plate in order to keep the arresting element in the position relative to the pressure plate to which it has moved; and
 an indicator arrangement comprising at least one opening in the housing and at least one indicator element on at least one of said wear compensating elements, said indicator element being visible through said opening, the position of the indicator element relative to the at least one opening providing information about the amount of wear of said friction clutch.

15. A pressure plate assembly as in claim 14 wherein said indicator element has a length in the direction of movement of said wear compensating device and a width transverse to said direction of movement, said width changing over the length of the indicator element.

16. A pressure plate assembly as in claim 15 wherein said width changes continuously over at least part of said length.

17. A pressure plate assembly as in claim 15 wherein said width has at least one radially stepped change over said length.

18. A pressure plate assembly as in claim 14 comprising a plurality of said indicator openings provided in succession in the direction of movement of said wear compensating element.

19. A pressure plate assembly as in claim 18 wherein said indicator element has an indicator section which in one state of wear fills essentially all of said indicator openings and in another state of wear fills at most only part of an indicator opening.

20. A pressure plate assembly as in claim 18 wherein said indicator element has an indicator section which does not fill all of the indicator openings in any state of wear.

21. A pressure plate assembly as in claim 20 wherein said indicator section completely fills one of said indicator openings in one state of wear and partially fills two of the indicator openings in another state of wear.

22. A pressure plate assembly as in claim 14 wherein said wear compensating element comprises an adjusting ring which can rotate around the axis of rotation to compensate for wear, said indicator element moving with said adjusting ring.

23. A pressure plate assembly as in claim 14 wherein said stored energy device is installed between said indicator element and said at least one indicator opening, said stored energy element having at least one see-through opening which is aligned with a respective at least one indicator opening.

24. A pressure plate assembly as in claim 23 wherein the energy storage device comprises a plurality of spring tongues defining open areas therebetween, said see-through openings being formed by respective said open areas.

25. A pressure plate assembly as in claim 14 wherein the indicator element comprises connecting sections which connect the indicator element to the wear compensating element.

26. A pressure plate assembly as in claim 14 wherein said indicator element comprises a contact area, and said wear compensating element has a surface facing said axis of rotation, said contact area supporting said indicator element on said surface.

* * * * *